(12) United States Patent
Fogal, Sr. et al.

(10) Patent No.: US 6,367,884 B1
(45) Date of Patent: Apr. 9, 2002

(54) WHEEL WITH WINDOW AND METHOD FOR VIEWING THE INTERIOR OF A TIRE WHEEL ASSEMBLY UNDER DYNAMIC CONDITIONS

(76) Inventors: Robert D. Fogal, Sr., 15 Kenwood Rd., Chambersburg, PA (US) 17201; Gary H. Koopmann, 220 Kennedy St., State College, PA (US) 16801

( * ) Notice: Subject to any disclaimer, the term of this patent is extended or adjusted under 35 U.S.C. 154(b) by 0 days.

(21) Appl. No.: 09/935,875

(22) Filed: Aug. 23, 2001

Related U.S. Application Data

(60) Provisional application No. 60/302,444, filed on Jul. 2, 2001.

(51) Int. Cl.[7] ................................................ B60B 21/00
(52) U.S. Cl. .................................................. 301/95.101
(58) Field of Search ........................ 301/108.2, 37.28, 301/95.101; 73/457, 460; 29/407.01, 407.04, 705, 894, 894.35

(56) References Cited

U.S. PATENT DOCUMENTS

| | | | | |
|---|---|---|---|---|
| 1,406,920 A | * | 2/1922 | Bolenbaugh et al. | 301/37.28 |
| 1,446,561 A | * | 2/1923 | Harris | 301/37.28 |
| 2,647,406 A | * | 8/1953 | Sorensen | 301/108.2 |
| 3,089,338 A | * | 5/1963 | Blasgow | 301/108.2 |
| 3,860,295 A | * | 1/1975 | Beisch | 301/108.2 |
| 3,873,837 A | | 3/1975 | Palermo, Jr. | |
| 4,032,785 A | | 6/1977 | Green et al. | |
| 4,171,794 A | | 10/1979 | Haskell et al. | |
| 4,234,256 A | | 11/1980 | Yeager | |
| 4,682,820 A | * | 7/1987 | Stalter | 301/37.28 |
| 5,414,512 A | | 5/1995 | Grant et al. | |
| 5,533,388 A | | 7/1996 | Yamamoto et al. | |
| 5,600,435 A | | 2/1997 | Bartko et al. | |
| 5,731,870 A | | 3/1998 | Bartko et al. | |
| 6,041,649 A | | 3/2000 | Femböck | |
| 6,128,952 A | * | 10/2000 | LeBlanc | 73/460 |

* cited by examiner

Primary Examiner—S. Joseph Morano
Assistant Examiner—Long Bao Nguyen
(74) Attorney, Agent, or Firm—Hahn, Loeser & Parks, LLP

(57) ABSTRACT

The present invention relates to a wheel rim having at least one window such that the interior of a tire mounted on the wheel rim may be viewed under dynamic conditions such as those provided by a dynamometer test machine. A method is also presented in which a camera and strobe light are used with the wheel rim having at least one window to record the reaction of flowable materials inserted into the pressure chamber of a tire wheel assembly at the tire footprint under loaded dynamic conditions.

22 Claims, 6 Drawing Sheets

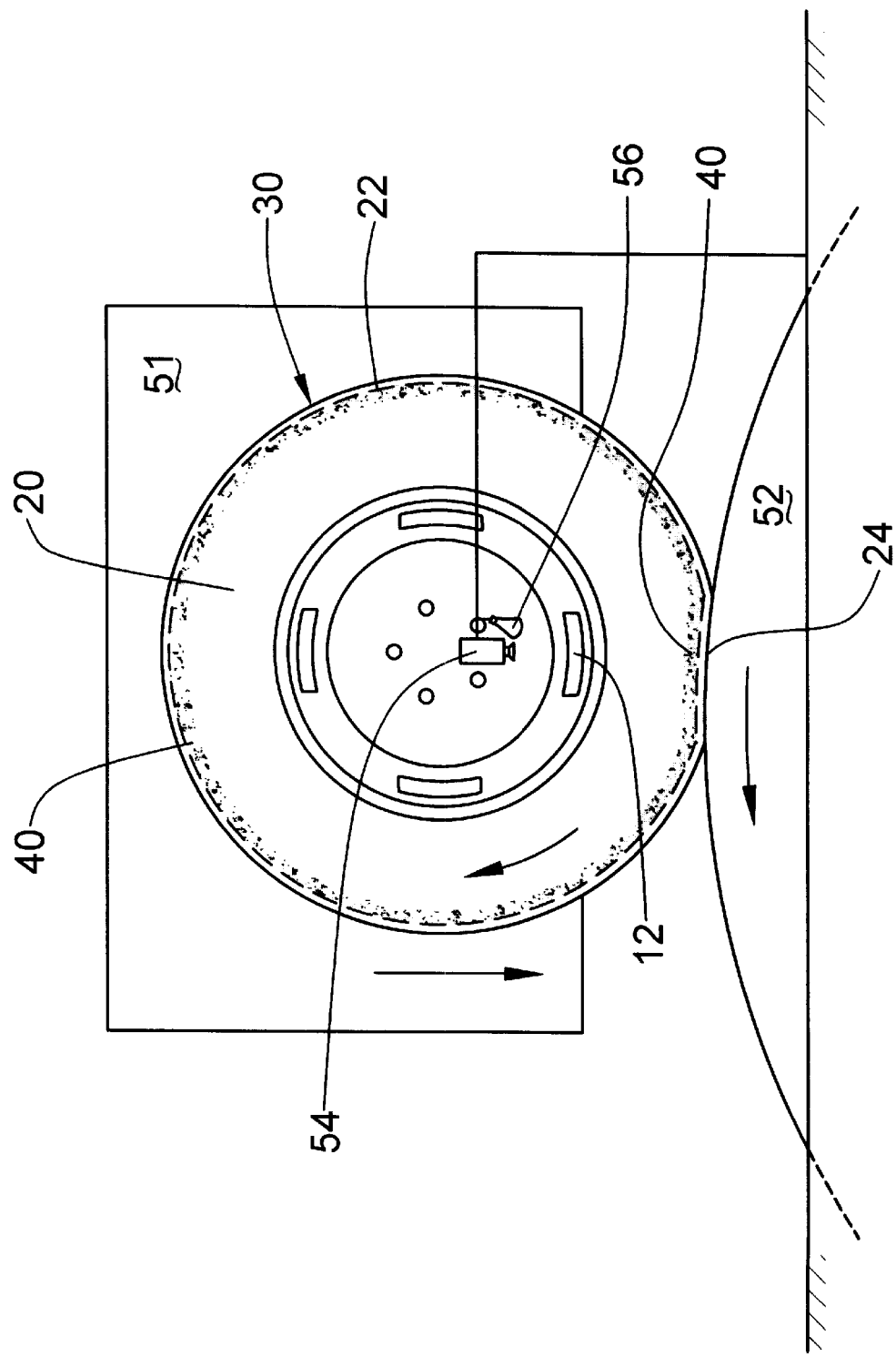

```
                                                    110
┌─────────────────────────────────────────────┐     
│ providing a tire wheel assembly comprising  │     
│ a tire mounted on a wheel rim having at     │─112 
│ least one window positioned to allow the    │     
│ interior of tire to be viewed               │     
└─────────────────────────────────────────────┘

┌─────────────────────────────────────────────┐
│ inserting a flowable material into the      │─122
│ tire wheel assembly                         │
└─────────────────────────────────────────────┘

┌─────────────────────────────────────────────┐
│ positioning a camera at a predetermined     │
│ location with respect to the tire wheel     │
│ assembly where the camera is directed       │─114
│ toward the window wherein the camera can    │
│ provide an image of the interior of the     │
│ tire wheel assembly                         │
└─────────────────────────────────────────────┘

┌─────────────────────────────────────────────┐
│ positioning a strobe light at a             │
│ predetermined location with respect to the  │
│ tire wheel assembly where the strobe light  │─118
│ is directed toward the window               │
└─────────────────────────────────────────────┘

┌─────────────────────────────────────────────┐
│ causing the tire wheel assembly to rotate   │─116
└─────────────────────────────────────────────┘

┌─────────────────────────────────────────────┐
│ applying a load force upon the tire wheel   │─126
│ assembly against a test surface             │
└─────────────────────────────────────────────┘

┌─────────────────────────────────────────────┐
│ coordinating a light flash from the strobe  │
│ light to correspond with the rotational     │─120
│ position and rotational speed of the window.│
└─────────────────────────────────────────────┘

┌─────────────────────────────────────────────┐
│ recording the movement of the flowable      │
│ materials in the rotating tire wheel        │─124
│ assembly.                                   │
└─────────────────────────────────────────────┘

┌─────────────────────────────────────────────┐
│ recording the force variations in the       │─128
│ rotating tire wheel assembly.               │
└─────────────────────────────────────────────┘
```

FIG. 5

WHEEL WITH WINDOW AND METHOD FOR VIEWING THE INTERIOR OF A TIRE WHEEL ASSEMBLY UNDER DYNAMIC CONDITIONS

This application claims the benefit of U.S. Provisional Application No.: APPLICATION NO. 60/302,444 FILING DATE Jul. 02, 2001

FIELD OF THE INVENTION

This invention relates to method and apparatus allowing visual access to the interior of a tire wheel assembly under dynamic conditions. More particularly, the present invention relates to a wheel rim having at least one window such that the interior of a tire mounted on the wheel rim may be viewed under dynamic conditions such as those provided by a dynamometer test machine.

BACKGROUND OF THE INVENTION

Vibration felt by a vehicle driver through the vehicle seat, steering wheel, and acceleration pedal are typically directly related to force variations encountered at the tire footprint which may be caused by a variety of sources. These sources include, but are not limited to, imbalance of the tire wheel assembly, runout of the wheel and/or tire, irregularities in the structure of the tire (non-uniformity), brake drag, wheel misalignment, road disturbances, worn linkages, etc. In recent years, automobile vehicles weights have been generally declining in order to improve gas mileage. A result of the weight loss is that the suspensions and wheel support parts have become lighter and more susceptible to vibration. Vibration, especially vibration due to non-uniformity of the tire and imbalance due to tire and/or wheel runout, is now a prominent issue for tire manufactures who are also under economic pressure to do more with less. In addition, lead balance weights used to correct tire wheel assembly imbalance, long considered a health concern, will likely be banned and a replacement for lead will need to be used to manufacture the weights.

It has long been known that inserting various materials into the interior of a tire wheel assembly could provide a benefit of balancing the tire wheel assembly. Internal flowable materials have long been used as a staple for many fleet managers in the trucking industry to help combat vibration, promote even tire wear, and extend tire life. The cause behind this benefit has been described in a variety of manners, the most common being the principle of mass balancing. Based on this theory, during tire rotation, free flowing materials contained the tire wheel assembly will seek a distribution in balance about the center of rotation and will tend to offset any imbalance inherent in the tire wheel assembly. However, while the performance of the internal materials could be verified both subjectively and by objectively by testing, none of the theories on the way the internal materials worked could be substantiated because it was impossible to see into the interior of the tire wheel assembly to see how the materials acted under operating conditions. Furthermore, without proving the mechanics of how the internal flowable material works, it has been recognized that at least some internally flowable materials not only work to reduce the vibratory effects of imbalance, but also work to reduce force variations due to non-uniformity of the tire as well as dampening other sources of vibration and noise.

Accordingly, internal flowable materials are positioned to help the tire and vehicle manufactures provide a better ride for their customers. However, testing variations of different materials may be necessary to optimize the make-up and/or amount of internal flowable material for a particular tire/vehicle application. This testing could be facilitated by a definite knowledge and comparison of how the internal flowable materials react to forces within the tire under dynamic conditions.

Other problems with the state of the prior art is with unsubstantiated and competing claims by some internal flowable material manufacturers which may confuse potential consumers as to how a product actually performs within a tire. With the introduction of various competing internally flowable materials, additional theories have been forwarded by these manufacturer in order to substantiate claims of superior performance of a particular material. As an example, one such manufacture using a material comprising glass beads has claimed that their glass beads, once properly positioned by the rotation of the tire wheel assembly to a position causing balance of the tire wheel assembly, will remain in this balancing position along the innerliner of the tire due to electrostatic cling produced by the tribological forces generated by the glass beads rubbing against the innerliner of the tire and against each other. The manufacturer has claimed that the glass beads remaining in position provided a benefit in that the internal balancing compound did not become displaced when the vehicle stopped, thus the tire wheel assembly remained in a dynamically balanced condition. As with the theories as to how these internal flowable materials worked, the electrostatic cling theory could not be substantiated or disproved because it was impossible to see into the interior of the tire wheel assembly to see how the materials acted under operating conditions.

There are a multitude of additional problems related to the inability to view the interior of a tire wheel assembly. Improved performance tests could be developed such as monitoring the development of innerliner cracking or monitoring specific interior areas of the tires under specialized test conditions.

Therefore, there remains a need in the art for a wheel and method that will enable the interior of the tire wheel assembly to be viewed under operating conditions.

SUMMARY OF THE INVENTION

An object of the present invention is to allow the interior of a tire to be viewed when the tire is mounted on a wheel rim as part of a tire wheel assembly. These and other advantages are provided by a wheel rim having at least one aperture formed therein. A transparent material is attached to the tubewell in a position covering the aperture in a manner preventing air loss and forming a window through the wheel rim.

These and other advantages are also provided by a tire wheel assembly comprising a tire mounted on a wheel rim having at least one aperture formed in a tubewell portion of the rim and a transparent material attached to the wheel rim and positioned over the aperture forming a window through which an interior surface of the tire is visible.

These and other advantages are also provided by a method of viewing the interior of a tire of a tire wheel assembly undergoing dynamic operations comprising the steps of providing at least one window in a tubewell portion of a tire wheel assembly; causing the tire wheel assembly to rotate against a test surface; and directing a camera toward a predetermined position where the window will occupy during at least a portion of its rotational path.

With the above, and other objects in view that will hereinafter appear, the nature of the invention will be more clearly understood by reference to the following detailed description and the several views illustrated in the accompanying drawings.

BRIEF DESCRIPTION OF THE DRAWINGS

FIG. 4 shows a portion of a test set up of the present invention to see the interior of the tire under dynamic conditions; and FIG. 5 shows a flowchart of the method of the present invention to see the interior of the tire under dynamic conditions.

DETAILED DESCRIPTION OF THE DRAWINGS

Figure 1:
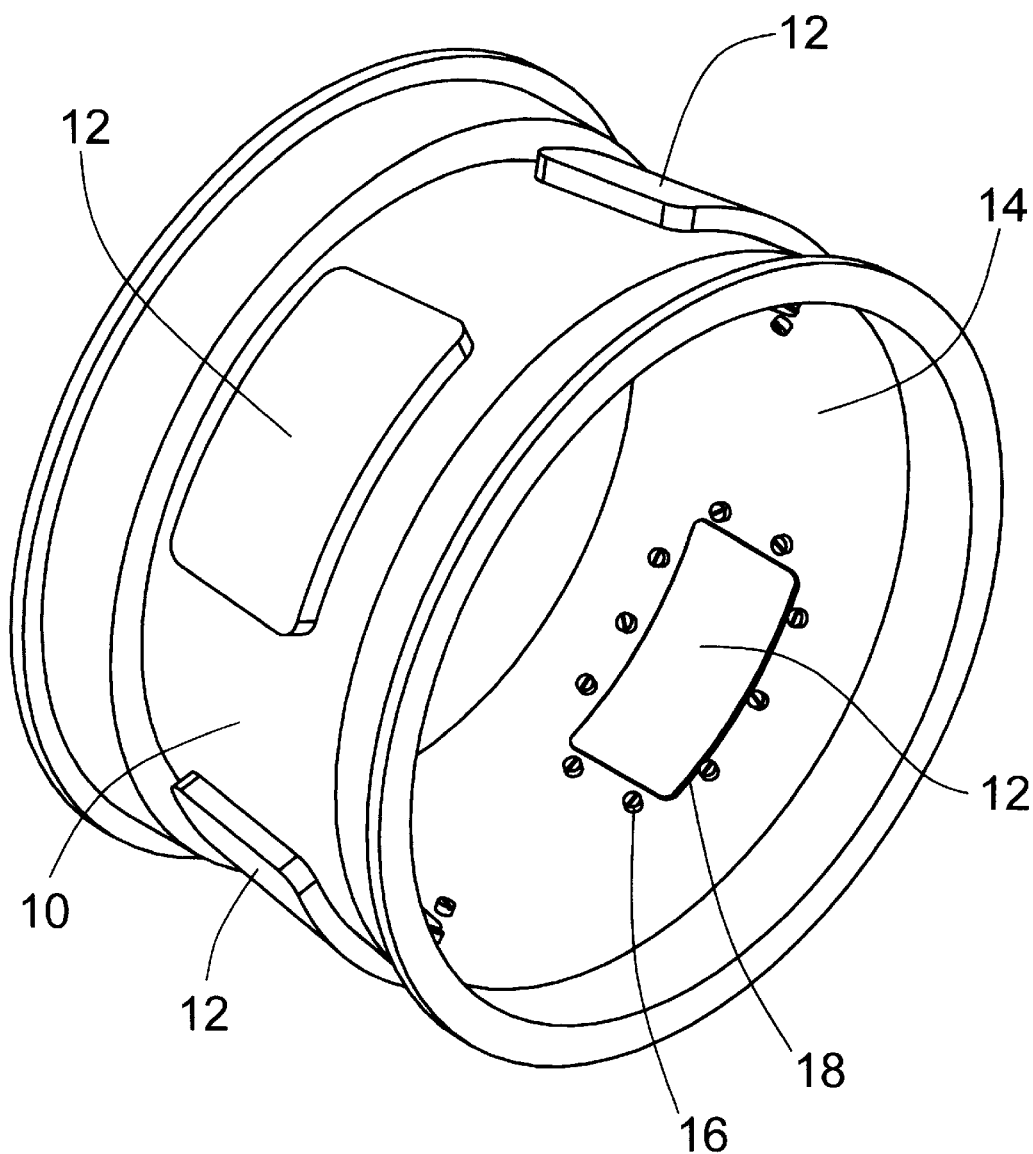
FIG. 1 shows a perspective view of a wheel rim having at least one see-through window in an embodiment of the present invention.

Reference is first made to FIG. 1 of the drawings which shows the wheel rim 10 of the present invention having at least one window 12 positioned in the tubewell section 14 of the wheel rim 10. The window 12 can be made of any appropriate transparent material which has sufficient strength such as various known plastic materials. The window 12 can be fastened to the wheel rim 10 using appropriate fasteners 16 and a gasket or sealant 18 around the perimeter to prevent loss of air pressure. Alternatively, the window 12 can also be bonded to the tubewell 14 with an adhesive, or attached in any appropriate manner. Still another alternative would be a hinged window that would allow access into the interior of the wheel rim 10 when an attached tire in unpressurized. This would prevent the need to dismount the tire from the wheel rim when inserting or removing an object from the tire wheel assembly.

Figure 2A:
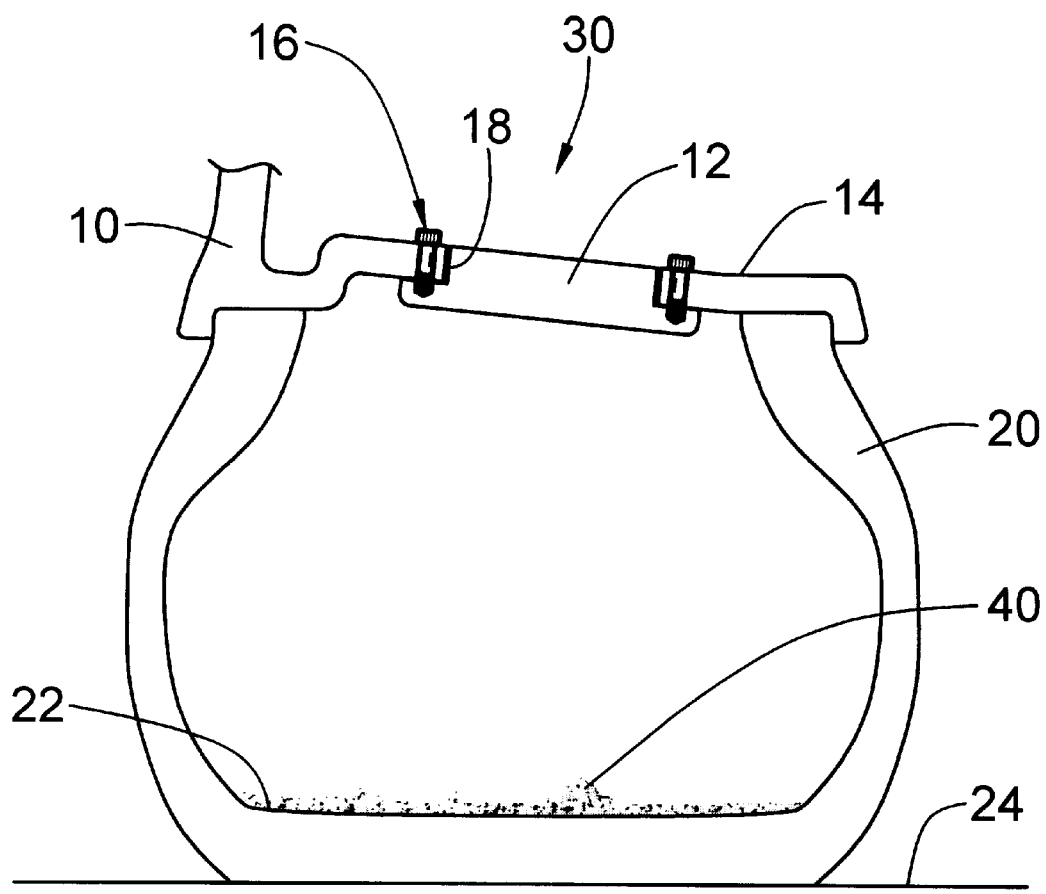
FIG. 2A shows a cross-sectional view of a tire wheel assembly of the present invention wherein an internal flowable material on the innerliner of the tire opposite the tire footprint is positioned below the window.

Referring now to FIG. 2A, window 12 is preferably positioned and of sufficient width and length to view a substantial portion of the interior surface or innerliner 22 of a tire 20 mounted on the wheel rim 10 to form a tire wheel assembly 30. As shown, window 12 is positioned on the tubewell 14 portion of wheel 10 and is large enough to allow viewing of the entire innerliner 22 at the tire footprint 24 when the tire wheel assembly 30 is under loaded conditions.

Figure 2B:
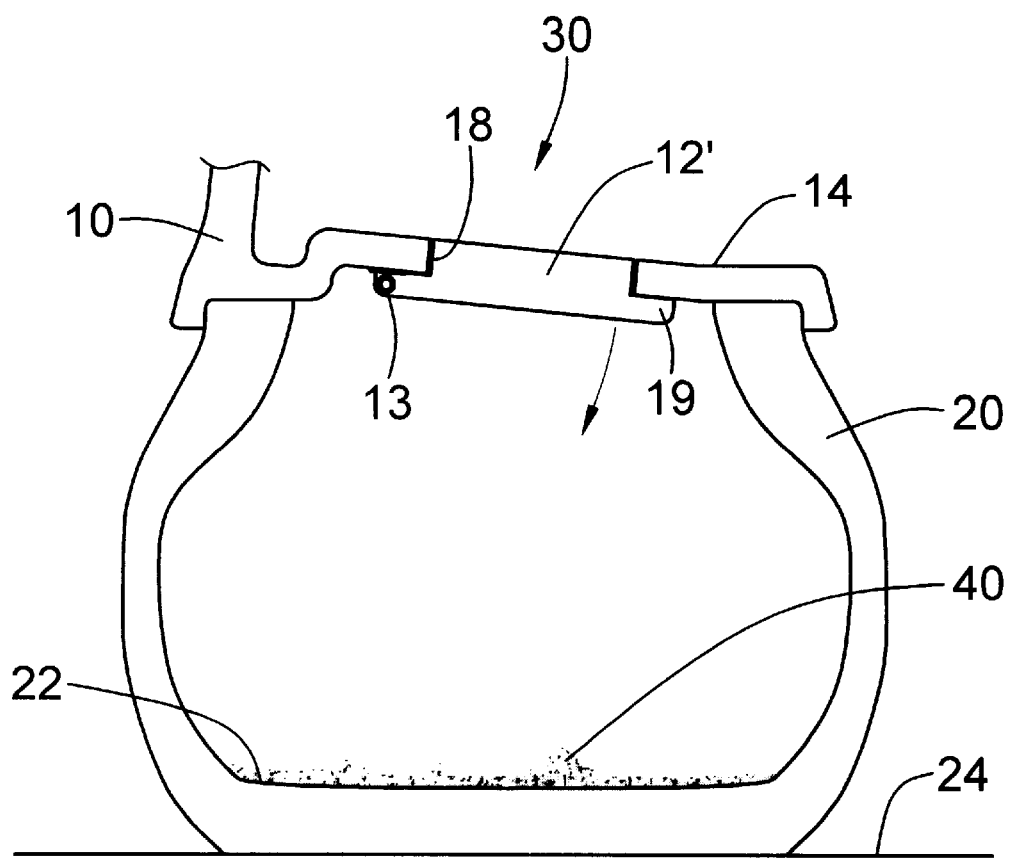
FIG. 2B shows a cross-sectional view of an alternate embodiment of the present invention wherein the window forms a door providing access to the interior of the tire wheel assembly under uninflated conditions.

Referring now to FIG. 2B, an alternate embodiment of window 12' comprise a hinge 13 which enables window 12' to be opened when tire wheel assembly 30 in unpressurized. The window 12' is sealed by releasable seal or gasket 18. When the tire wheel assembly is unpressurized, the gasket 18 holds the window 12' in place. Although not shown, it is also contemplated that the window 12' could be held shut by a rotatable bar, a releasable snap, latch, or other holding mechanism which can be relatively quickly opened to allow access to the interior of the tire wheel assembly 30. When inflated, the window 12' is preferably shaped and positioned such that the air pressure will help seal and retain the window 12' in position, such as by flange 19.

Figure 3:
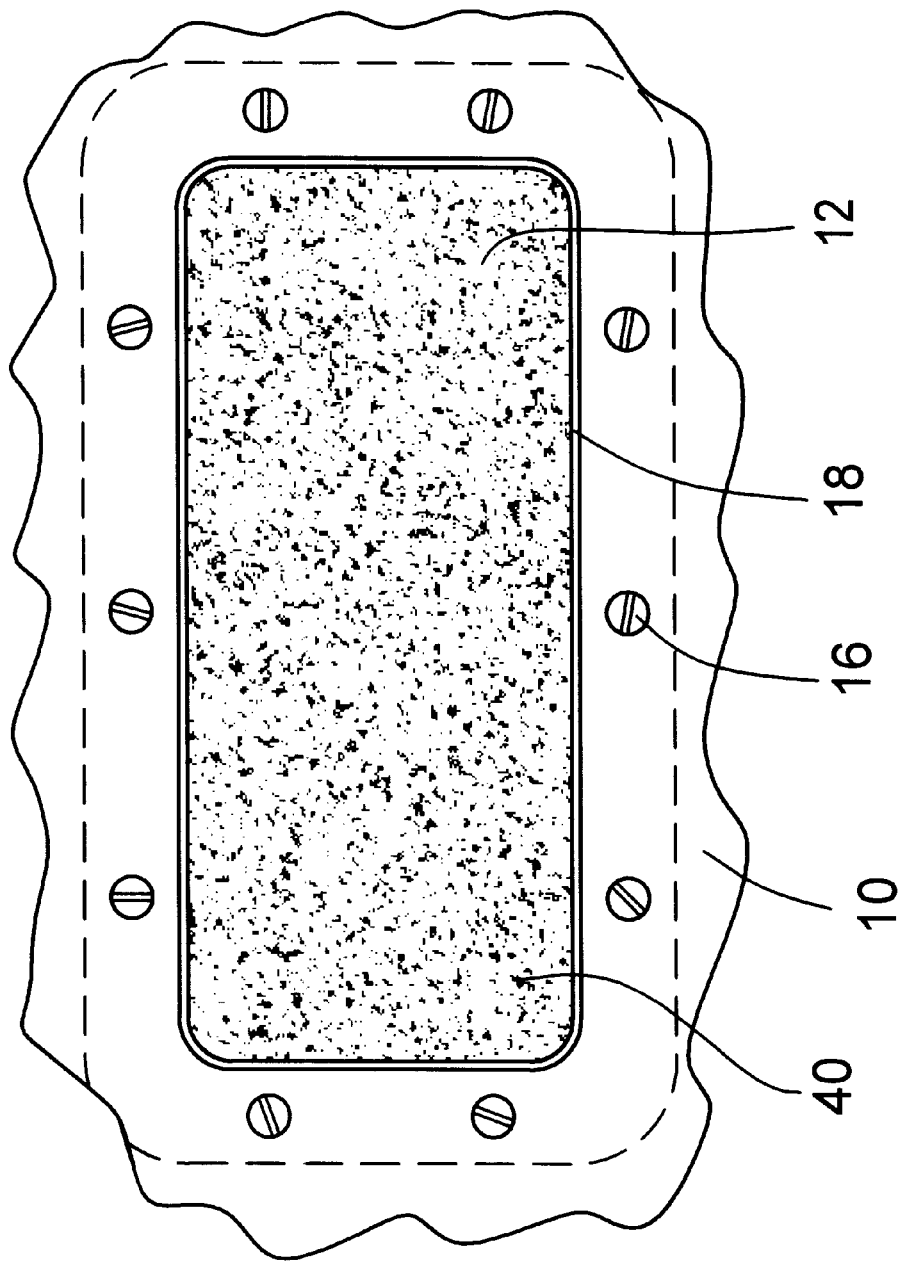
FIG. 3 shows a view of a tire wheel assembly of the present invention wherein the innerliner of the tire opposite the tire footprint is visible through the window.

Referring now to FIG. 3, a flowable material 40 has been inserted into the tire wheel assembly 30 and is visible on the innerliner 22 of the tire 20 through window 12. Under dynamic conditions, the reaction of the flowable material 40 to dynamic loads at the tire footprint (as well as any location around the tire) can be studied.

In FIG. 4, the visual set-up is shown. A camera 54 is positioned on the inboard side of the wheel rim 10 and directed toward window 12. Window 12 is shown positioned over the tire footprint 24 which is adjacent dynamometer wheel 52. Flowable material 40 inserted into the tire wheel assembly 30 is visible through window 12 and camera 54. A strobe light 56 is also directed toward window 12, shown positioned over the tire footprint 24 against dynamometer wheel 52. The tire wheel assembly 30 is attached to a dynamometer carriage 51 which forces the tire wheel assembly 30 against dynamometer wheel 52. The strobe light 56 provides sufficient illumination of the innerliner 22 of the tire 20. During dynamic conditions, the strobe light 56 is coordinated with the rotational speed of the tire wheel assembly 30 such that the strobe light only flashes when the window 12 is directly in the frame of camera 54 such as when it is overtop footprint 24 or at any other predetermined location. This enables video or still from camera 54 to provide a frame by frame shot of the tire innerliner 22 for each rotation of the tire wheel assembly 30. When directed at the tire footprint 24, the reaction of the inserted flowable material 40 to dynamic loads can be studied. By rotating the camera 54 and strobe light 56 to different radial positions of the tire wheel assembly 30, the reaction of the inserted flowable material 40 positioned away from the footprint 24 can be studied.

Referring now to FIG. 5, the method 110 for viewing the interior of the tire 20 under dynamic conditions is depicted. The method 110 comprises the steps of providing a tire wheel assembly comprising a tire mounted on a wheel rim having at least one window positioned to allow the interior of tire to be viewed 112; positioning a camera at a predetermined location with respect to the tire wheel assembly where the camera is directed toward the window wherein the camera can provide an image of the interior of the tire wheel assembly 114; and causing the tire wheel assembly to rotate 116. In addition, other steps may be included to help view the interior of the tire wheel assembly such as positioning a strobe light at a predetermined location with respect to the tire wheel assembly where the strobe light is directed toward the window 118 and coordinating a light flash from the strobe light to correspond with the rotational position and rotational speed of the window 120. When using the method with flowable materials the method may include the steps of inserting a flowable material into the tire wheel assembly 122 and recording the movement of the flowable materials in the rotating tire wheel assembly 124. The method may also include the steps of applying a load force upon the tire wheel assembly against a test surface 126 and recording the force variations in the rotating tire wheel assembly 128.

In addition to providing a method and apparatus for viewing the interior of the tire 20 under dynamic conditions, the window 12 allows the interior tire surface 22 to be checked after the tire wheel assembly 30 stops rotating.

While the present invention is especially effective for viewing flowable materials inserted into the pressure chamber of tire wheel assembly under dynamic conditions, it is contemplated that the tire wheel assembly window can be used for other tests related to tire performance such as monitoring the development of innerliner cracking or monitoring specific interior areas of the tires under specialized test conditions. It is also contemplated that different types of cameras such as infrared or other types may be used to provide useful information regarding the interior of the tire. Although not specifically shown it is contemplated that the present invention could be used on any dynamometer or Flat-Trac® type testing machine, as well as used in conjunction with an on-vehicle set up.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A wheel comprising:
   a wheel rim having at least one aperture; and
   a transparent material attached to the wheel rim and covering the aperture in a manner preventing air loss and forming a window through the wheel rim.

2. The wheel of claim 1, wherein the aperture is formed in a tubewell portion of the wheel rim.

3. The wheel of claim 1, wherein the transparent material is plastic.

4. The wheel of claim 1, wherein a gasket is positioned between the transparent material and the wheel.

5. The wheel of claim 1, wherein the transparent material is attached to the wheel by a plurality of fasteners.

6. The wheel of claim 1, wherein the transparent material is attached to the wheel by an adhesive.

7. A tire wheel assembly comprising:
   a wheel rim having at least one aperture formed in a tubewell portion of the rim;
   a tire mounted on the wheel rim;
   a transparent material attached to the wheel rim and positioned over the aperture forming a window through which an interior surface of the tire is visible.

8. The tire wheel assembly of claim 7, wherein a gasket is positioned between the transparent material and the wheel.

9. The tire wheel assembly of claim 7, wherein a sealant is placed between the transparent material and the wheel.

10. The tire wheel assembly of claim 7, wherein the transparent material is attached to the wheel by a plurality of fasteners.

11. The tire wheel assembly of claim 7, wherein the material is attached to the wheel by an adhesive.

12. The tire wheel assembly of claim 7, wherein the material is plastic.

13. A method of viewing the interior of a tire undergoing dynamic operations comprising the steps of:

a) providing a tire wheel assembly comprising a tire mounted on a wheel rim having at least one window positioned to allow the interior of tire to be viewed;
   b) positioning a camera at a predetermined location with respect to the tire wheel assembly where the camera is directed toward the window wherein the camera can provide an image of the interior of the tire wheel assembly; and
   c) causing the tire wheel assembly to rotate.

14. The method of claim 13 further comprising the step of positioning a strobe light at a predetermined location with respect to the tire wheel assembly where the strobe light is directed toward the window.

15. The method of claim 14 further comprising the step of coordinating a light flash from the strobe light to correspond with the rotational position and rotational speed of the window.

16. The method of claim 13 further comprising the step of applying a load force upon the tire wheel assembly against a test surface.

17. The method of claim 13 further comprising the step of inserting a flowable material into the tire wheel assembly.

18. The method of claim 17 further comprising the step of recording the movement of the flowable materials in the rotating tire wheel assembly.

19. The method of claim 13 further comprising the step of recording the force variations in the rotating tire wheel assembly.

20. A method of viewing the interior of a tire of a tire wheel assembly undergoing dynamic operations comprising the steps of:

a) providing at least one window in a tubewell portion of a tire wheel assembly;
   b) causing the tire wheel assembly to rotate against a test surface; and
   c) directing a camera toward a predetermined position where the at least one window will occupy during at least a portion of it rotational path.

21. The method of claim 20 further comprising the step of inserting a flowable material into the tire wheel assembly.

22. The method of claim 20 further comprising the step of recording the movement of the flowable materials in the rotating tire wheel assembly.

* * * * *